Jan. 29, 1946.  W. L. PARKER  2,393,805
CONTROL VALVE
Filed June 3, 1942   2 Sheets-Sheet 2
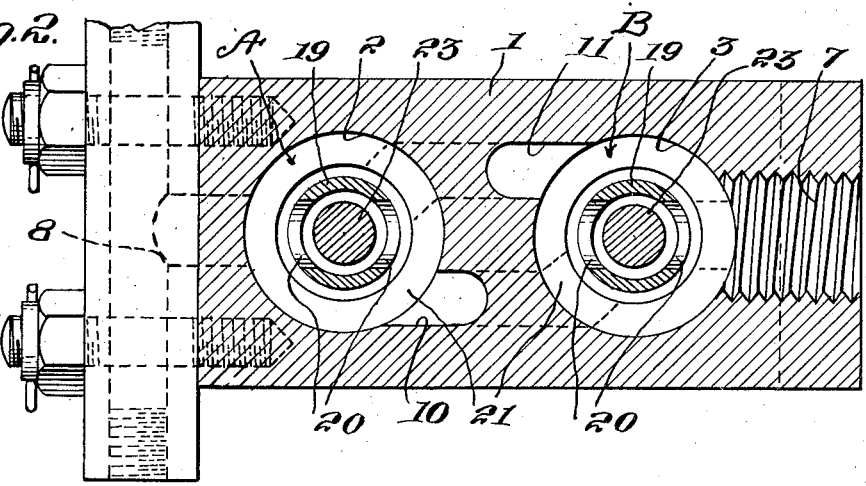
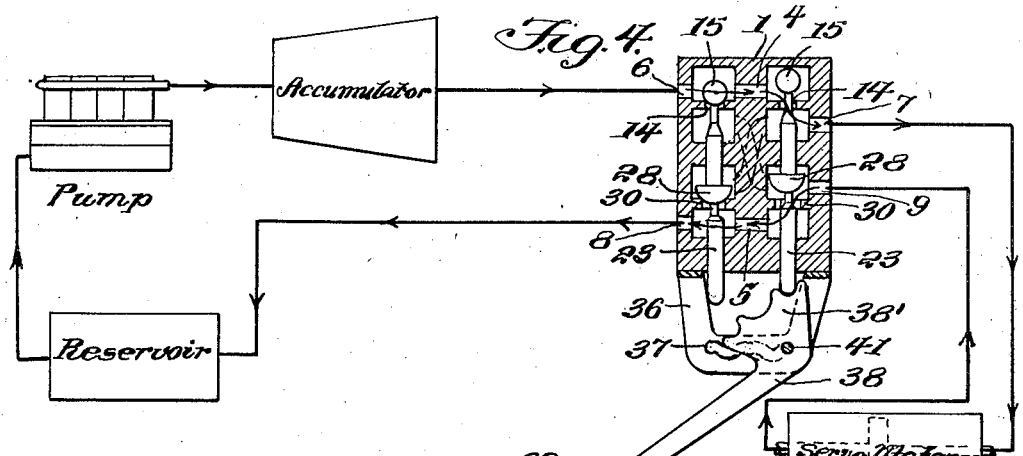
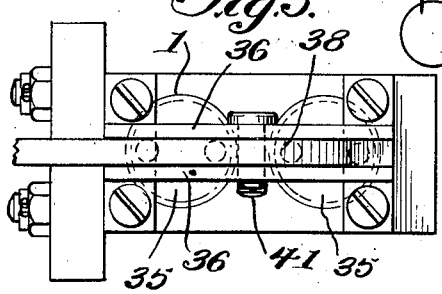
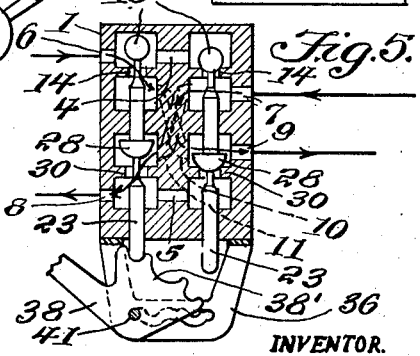
INVENTOR.
WARDE L. PARKER,
BY C. B. Stevens
ATTORNEY Patented Jan. 29, 1946

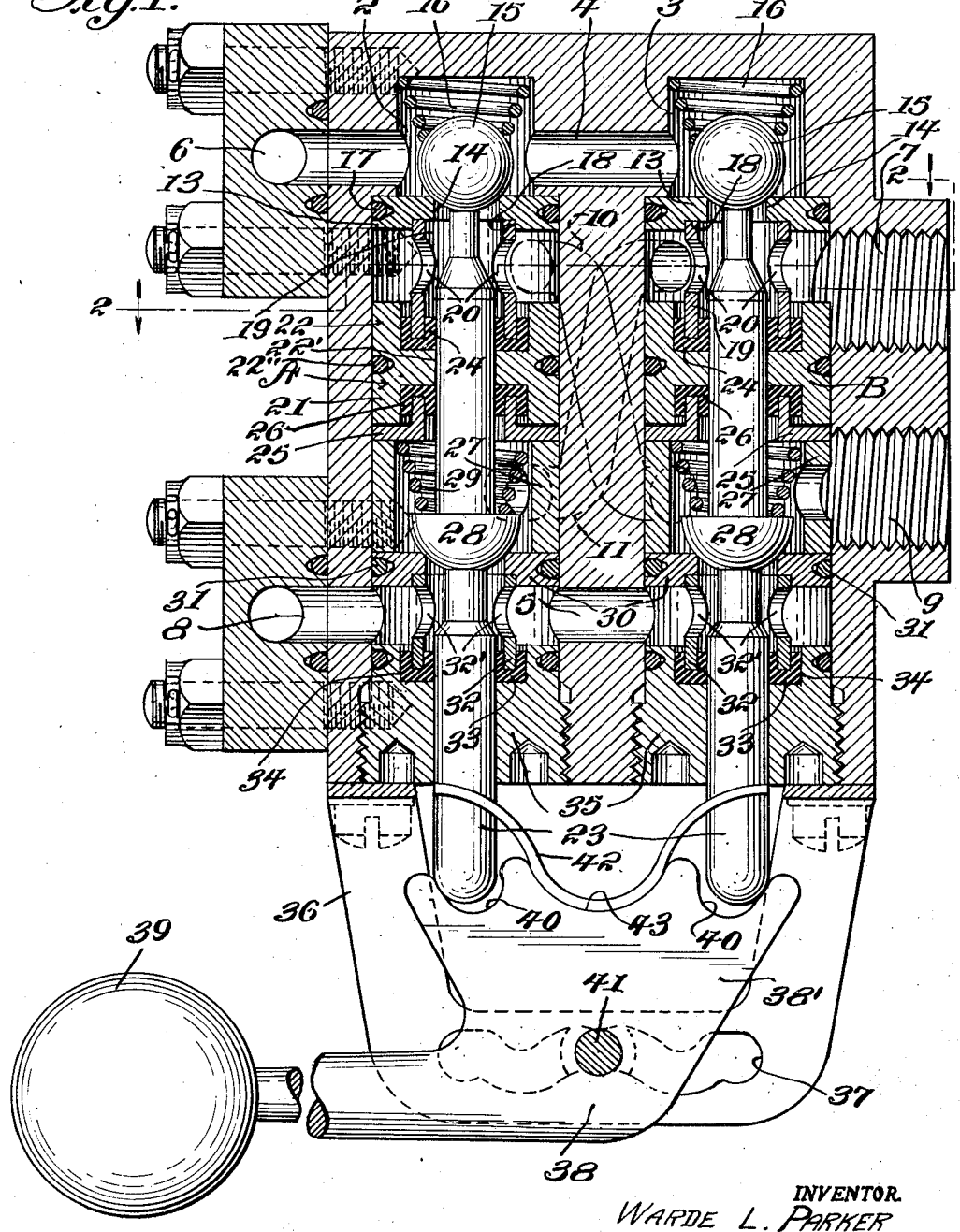

2,393,805

UNITED STATES PATENT OFFICE 2,393,805

CONTROL VALVE

Warde L. Parker, Huntington Park, Calif., assignor to United Aircraft Products, Inc., Dayton, Ohio, a corporation of Ohio Application June 3, 1942, Serial No. 445,615

6 Claims. (Cl. 277—20)

This invention relates to a control valve and more particularly a valve of the multiple control type.

The primary object of the invention is to provide an improved valve of the above character, wherein a single operating member controls the flow of fluid to and from a servo motor, which latter is provided with a single piston and oppositely disposed piston rods, that are employed to actuate various parts of airplanes, such as wing flaps, rudders, etc., as is well known in the art.

A further object of the invention is to provide a multiple valve wherein the mechanism is extremely compact, and is attended with certainty of operation.

A further object of the invention is to provide a multiple valve for controlling the flow of fluid to and from a servo motor and for reversing the path of flow of such fluid and thereby the direction of operation of such motor.

A further object of the invention is to provide a valve of the above character which may be readily connected, or coupled, in series to thereby control a multiplicity of servo motors from a single operating station.

A still further object of the invention is to provide a valve of the above character which is of simple construction, and which may be economically manufactured.

The invention still further aims to provide novel means for selectively operating the valves by or from a single actuating member, and also by a conjoint bodily sliding and pivotal movement of the member, whereby to provide for positive and free actuation of the valve carrying stems.

Another objective of the invention is to provide a balanced valve structure, wherein the valve stems are effectively guided and tensioned.

Still further the invention aims to provide a valve structure which facilitates assemblage.

The invention has still further and other objectives, which will later be set forth, and also of themselves manifested in the course of the following description.

In the drawings:

Fig. 1 is a vertical sectional view of the invention, partly broken away, and with one of the bracket members for the operating lever omitted;

Fig. 2 is a section on line 2—2 of Fig. 1;

Fig. 3 is a detail bottom plan view of Fig. 1, the operating lever being broken away;

Fig. 4 is a schematic view showing servo motor and associated devices, and the valve operating lever in one of its positions; and Fig. 5 is a view similar but in fragment to Fig. 4, showing the valve operating member in a second of its positions.

In proceeding in accordance with the present invention, a housing or casing 1 is provided and is formed with a pair of spaced and vertically or longitudinally disposed valve chambers 2 and 3.

The valve chambers 2 and 3 are connected at their upper ends by a horizontally extending fluid passage 4 and at their lower ends by a horizontally extending fluid passage 5. The upper passage 4 is provided at one end with a main inlet port 6 and at its opposite end with a combined outlet and return inlet port 7, while the lower passage 5 is provided at one end with a main outlet port 8 on the same side with and immediately below the main inlet port 6. The opposite end of the lower passage 5 is further provided with a secondary outlet and return inlet port 9.

The vertically disposed valve chambers 2 and 3 are further connected by a pair of non-communicating spaced crossed passages 10 and 11, the upper end of the passage 10 communicating with the valve chamber 2 adjacent the upper end of the latter but below the passage 4, while its opposite end is connected to the chamber 3 adjacent the lower end thereof but above the passage 5.

The passage 11 has its upper end communicating with the upper end of chamber 3 below the passage 4, while the opposite end thereof is connected to the chamber 2 above but closely adjacent to the lower passage 5.

Disposed in the chambers 2 and 3 are valve assemblages, designated generally as A and B, respectively, which are duplicates of each other. A description of one therefore will suffice for both. It comprises a plate 13 which seats against a downwardly facing shoulder in the upper end of the related chamber and is provided with an opening 14 with which cooperates a downwardly closing ball valve 15, the valve being normally held upon its seat by means of a coil spring 16 positioned between the valve and the upper end wall of the chamber.

The periphery of the plate 13, is grooved to receive a packing 17, which engages the wall of the chamber 2 so as to prevent the passage of fluid therebetween.

The lower face of the plate 13, is recessed at 18, to receive the upper edge of a tubular, or sleeve-like spacer 19, the latter being formed with openings 20, to provide a passage for fluid between the cross passage 10, opening 14 and the upper horizontal passage 4. Below and spaced from the tubular member 19 is a cylinder 22 having, intermediate its ends, a partition 22' in which is a central opening which serves as a guide for a valve operating stem 23. The periphery of cylinder 22, is provided with packing 22''. The lower end of the tubular member 19, seats within a circular grooved packing 24 supported by the upper face of the partition 22'.

Beneath the cylinder 22 is a collar 25 having a central opening surrounded by an upwardly extending flange between which latter and the lower face of the partition 22' is interposed a packing 26, similar to packing 24.

Contacting the lower face of the collar 25 is a cylinder 27 of a length to provide a chamber in which a valve 28 formed integral with or rigidly affixed to, the stem 23, is free to move or reciprocate in a direction axially of the cylinder 27. A second coil spring 29, is disposed within this chamber between the collar 25, and valve 28 so as to urge the latter in a downward direction.

A ported plate 30 forming a seat for the valve 28, is disposed beneath and engages the lower end of the cylinder 27, and has its peripheral edge grooved to receive a packing 31 to prevent the passage of fluid in a manner similar to the first named packing 17.

A sleeve-like spacer 32, which has a pair of opposed ports 32' formed therein, and alined with the lower horizontal passage 5, has its upper end engaging the lower face of plate 30 while its lower end is received within a grooved packing 33, the packing being disposed in a recess 34, of a screw threaded retaining plug 35, the latter acting to hold all of the aforementioned parts in assembled relation.

The plug 35 is formed with a central opening which receives and provides a supplemental guide for the valve stem 23, the latter having its lower end portion projecting beyond the lower face of the housing 1 for a purpose to be now described.

Secured to the lower face of the housing 1, and depending therefrom is a pair of spaced opposed U-shaped bracket members 36 the lower portion of each of which is formed with a double cam slot 37.

A bodily shiftable valve operating lever, or member 38 of substantially L-shape is disposed between the bracket members and is provided at one end with a hand engaging knob 39, while its opposite end is enlarged as indicated at 38', and formed with curved recesses or re-entrant portions, which provide seats 40 for the valve stems 23.

The member 38 is not only pivotally mounted by means of a pin 41, which is carried thereby, the ends of the pin being engaged with the walls defining the cam slots 37 so as to provide a fulcrum for the handle, but is also bodily shiftable along the lengths of the slots.

A leaf spring 42 of substantially U-shape is disposed between the bracket members and has its bight portion seated in a correspondingly U-shaped recess 42 formed in the enlarged end 38' of the member 38, so as to be supported thereby. The spring acts to prevent undue play or motion between the handle and valve stems 23, when member 38 is rocked to actuate either of the valve stems. When the member 38 is bodily shifted and rocked, the pin 41 thereof rides in the slots 37, in a direction toward the valve stem 23 which is to be operated, so that the force exerted by the enlarged end 38' of the valve operating member 38 will be in a straight line acting against the valve stems. Thus if the valve stem 23 to the right of Fig. 4, is to be actuated, the member 38 is shifted to the right of Fig. , so that the pin will engage the adjacent ends of the slots 37, and upon downward rocking of member 38, force exerted against the valve stem 23 will be in a straight line, and the latter will thus not be subjected to any binding action.

Similarly, if the valve stem 23 to the left of Figs. 4 and 5 is to be actuated the lever 38 is shifted to the left but rocked in an upward direction as shown in Fig. 5. It will thus be seen that the lever is not only bodily shifted but also rocked in reverse directions according to which of the valve stems 23 is to be actuated.

In operation:

Assuming the piston of the servo motor is disposed substantially midway of the cylinder, and all of the valves are closed as shown in Fig. 1, the lever is moved downwardly to the position shown in Fig. 4. This action causes shifting of the pin 41 toward the right end of the cam slot 37, resulting in vertical movement of the valve stem 23 to open the valves 15 and 28 disposed at the right of Fig. 4.

The actuating fluid from the accumulator is thereby permitted to pass through inlet port 6, horizontal passage 4, and outlet 7 to the right side of the piston, the fluid in the line to the left of the piston of the servo motor being simultaneously exhausted through port 9, horizontal passage 5, and outlet port 8 to a reservoir, as shown in Figure 4.

If it is desired to move the piston of the servo motor toward the right of Fig. 4, the lever 38 is moved in an upward direction. This action causes pin 41 to shift the lever to the left and then engage and actuate the valve stem 23, and open valves 15 and 28 at the left of Fig. 4, while the valves 15 and 28 to the right of Fig. 4 will be closed under the influence of the springs 16 and 29. With the valves in the position just described, and also shown in Fig. 5, the actuating fluid passes through inlet port 6, thence downwardly past valve 14, through cross passage 10, and thence to the left side of the servo motor piston through the outlet port 9. The fluid is exhausted from the right side of the piston by flowing through the port 7, cross passage 11, thence outwardly through the exhaust port 8 to the reservoir.

From the foregoing it will be seen that a simple, compact structure is provided and wherein there is but a single inlet 6 and a single outlet 8 for the passage of the actuating fluid regardless of the position of the actuating lever.

It is to be understood that the form of the invention herein shown and described is to be taken as a preferred example of the invention, and that various changes in the shape, size and arrangement of parts may be resorted to without departing from the spirit of the invention or the scope of the subjoined claims.

What is claimed is:

1. A valve device comprising a casing having an elongated valve chamber and two pairs of ports opening into said chamber, said pairs of ports being spaced apart longitudinally of said chamber and the ports of each pair also being spaced apart longitudinally of said chamber; a valve seat element in said chamber between the ports of each pair, means in the chamber separating the ports of the respective pairs, each valve seat element being movable in said chamber and having a central port therein affording communication between the ports of its related pair, yieldable means constituting stops for said valve seats, a pair of valves for cooperation with said valve seat elements, respectively, to simultaneously open and close the ports therein, a single stem by which said valves are rigidly carried, and spring means acting on said valve stem to press said valves to closed positions on said valve seats and to press said valve seats against said yieldable stops.

2. A valve device comprising a casing having an elongated valve chamber and two pairs of ports opening into said chamber, said pairs of ports being spaced apart longitudinally of said chamber and the ports of each pair also being spaced apart longitudinally of said chamber, a ported valve seat plate in said chamber between the ports of each pair, spacing elements between said plates, means holding said plates and said spacing elements in series relationship in said chamber, a longitudinally movable valve stem extending through said plates and spacing elements, and a pair of valves fixed on and movable with said stem to simultaneously open and close the ports in said plates, respectively, thus to simultaneously establish and deny communication between the ports of said pairs of ports, certain of said spacing elements being resilient to permit a small amount of movement of said valve seat plates longitudinally of said chamber to insure tight seating of both of said valves upon said plates when said valves are closed.

3. A valve device comprising a casing having an elongated valve chamber and two pairs of ports opening into said chamber, said pairs of ports being spaced apart longitudinally of said chamber and the ports of each pair also being spaced apart longitudinally of said chamber, a ported valve seat plate in said chamber between the ports of each pair, spacing elements between said plates, means holding said plates and said spacing elements in series relationship in said chamber, a longitudinally movable valve stem extending through said plates and spacing elements, and a pair of valves fixed on and movable with said stem to simultaneously open and close the ports in said plates, respectively, thus to simultaneously establish and deny communication between the ports of said pairs of ports, certain of said spacing elements being rigid, other of said spacing elements being resilient to permit a small amount of movement of said valve seat plates longitudinally of said chamber to insure tight seating of both of said valves upon said plates when said valves are closed, and certain of said resilient spacing elements having sealing cooperation with certain of said rigid spacing elements and with said valve stem to prevent leakage of fluid along said valve stem.

4. A valve device comprising a casing having an elongated valve chamber and two pairs of ports opening into said chamber, said pairs of ports being spaced apart longitudinally of said chamber and the ports of each pair also being spaced apart longitudinally of said chamber, a shoulder in said chamber between the ports of one pair facing toward the ports of the other pair, a valve seat plate in said chamber disposed against said shoulder and having a central port therein, a partition element in said chamber between said pairs of ports, said partition element being movable longitudinally relative to said chamber and having a central valve-stem-accommodating and guide opening therein, said partition element also having a central recess in its end facing said valve seat plate, a resilient sealing ring in said recess, an apertured tubular spacing element interposed between said valve seat plate and said sealing ring and affording communication between the port in said valve seat plate and one of the ports of said first mentioned pair, a second valve seat element slidable in said chamber between the ports of the other pair and having a central port therein, a second apertured tubular spacing element between said partition element and said second valve seat element affording communication between the port in said second valve seat element and one of the ports of the second mentioned pair, a plug threaded in said chamber at the side of said second mentioned valve seat member remote from said last mentioned spacing element, a third apertured tubular spacing element between said plug and said second mentioned valve seat member affording communication between the port in said second mentioned valve seat member and the other of the second mentioned pair of ports, sealing means between said partition element and the wall of said chamber and also between each of said valve seat elements and the wall of said chamber, a valve stem extending through said valve seat elements, partition element, tubular spacing elements, and said plug, and a pair of valves carried by and rigid with said stem for simultaneously opening and closing the ports in said valve seat elements, said resilient sealing ring permitting slight movement of said second mentioned valve seat member longitudinally relative to said chamber to insure tight seating of both of said valves when the same are closed and also cooperating with said partition element and said valve stem to prevent any leakage through the valve stem guide opening in said partition element from the ports of either pair of the ports of the other pair.

5. A valve device as set forth in claim 4 including a resilient sealing ring between the partition element and the second mentioned tubular spacing element surrounding the valve stem in sealing engagement therewith.

6. A valve device as set forth in claim 4 including a resilient sealing ring between the plug and the third mentioned tubular spacing element surrounding the valve stem in sealing engagement therewith.

WARDE L. PARKER.